United States Patent
Frusti et al.

[11] Patent Number: 6,053,529
[45] Date of Patent: Apr. 25, 2000

[54] OCCUPANT RESTRAINT SYSTEM WITH SEAT POSITION SENSOR

[75] Inventors: Thomas Matthew Frusti; Mitchell Nicholas Williams, both of Canton, Mich.

[73] Assignee: Ford Global Technologies, Inc., Dearborn, Mich.

[21] Appl. No.: 08/995,932

[22] Filed: Dec. 22, 1997

[51] Int. Cl.[7] .............................. B60R 21/32; B60N 2/06; B60N 2/24

[52] U.S. Cl. ................... 280/735; 296/65.13; 296/68.1; 324/207.24; 248/429

[58] Field of Search ......................... 307/10.1; 280/735; 296/68.1, 65.13, 65.14, 65.15; 248/429; 324/207.24, 207.2

[56] References Cited

U.S. PATENT DOCUMENTS

| | | | |
|---|---|---|---|
| 4,909,560 | 3/1990 | Ginn | 296/65.15 |
| 5,074,583 | 12/1991 | Fujita | 280/735 |
| 5,161,820 | 11/1992 | Vollmer . | |
| 5,330,226 | 7/1994 | Gentry et al. . | |
| 5,413,378 | 5/1995 | Steffens et al. . | |
| 5,450,009 | 9/1995 | Murakami | 324/207.21 |
| 5,490,069 | 2/1996 | Gioutsos et al. . | |
| 5,573,269 | 11/1996 | Gentry et al. . | |
| 5,608,317 | 3/1997 | Hollmann | 324/207.2 |
| 5,624,132 | 4/1997 | Blackburn et al. . | |
| 5,626,359 | 5/1997 | Steffens, Jr. et al. . | |
| 5,652,510 | 7/1997 | Kyodo | 324/207.16 |
| 5,653,462 | 8/1997 | Breed et al. . | |
| 5,670,853 | 9/1997 | Bauer | 318/286 |
| 5,751,129 | 5/1998 | Vergin | 318/467 |
| 5,796,247 | 8/1998 | Pape | 324/207.2 |
| 5,893,582 | 4/1999 | Allen | 280/735 |

FOREIGN PATENT DOCUMENTS 5-213142 8/1993 Japan .

*Primary Examiner*—Peter C. English
*Assistant Examiner*—Ruth Ilan
*Attorney, Agent, or Firm*—David B. Kelley

[57] ABSTRACT

A deployable passenger restraint system for an automotive vehicle has an occupant seat mounted on a seat track for adjustable movement in a longitudinal direction, the seat track having a movable rail in slidable relationship with the stationary rail mounted to the vehicle floor. The system includes a deployable restraint mounted in a forward location of the vehicle, a deployment mechanism for deploying the restraint, a deployment restraint processor for receiving and processing restraint deployment signals and for controlling the deployment mechanism, and a seat position sensor. The seat position sensor has a stepped flange adapted to be mounted along a predetermined length of a flange side of the movable rail, and a magnetic sensor adapted to be mounted to the stationary rail on a sensor side adjacent the flange side for sensing presence of the flange and relaying a single representative of seat position to the deployment processor. The magnetic sensor generates a single representing seat position in three zones, including a first zone represented by a first flange section having a first height, a second zone represented by a second flange section having a second height, and a blank section represented by that portion of the seat track not covered by a flange section.

6 Claims, 2 Drawing Sheets

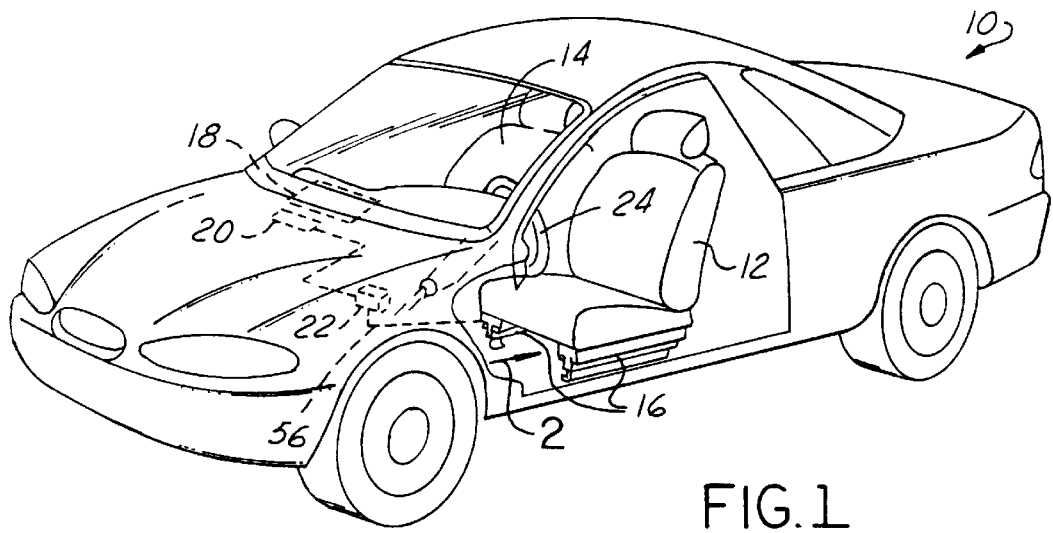
FIG.1
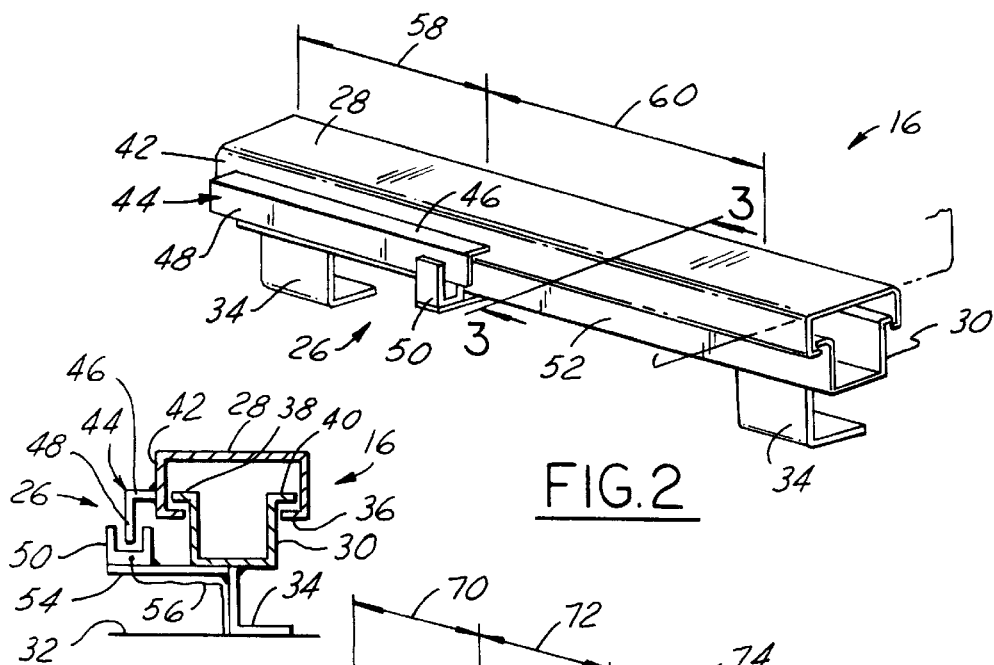
FIG.2
FIG.3
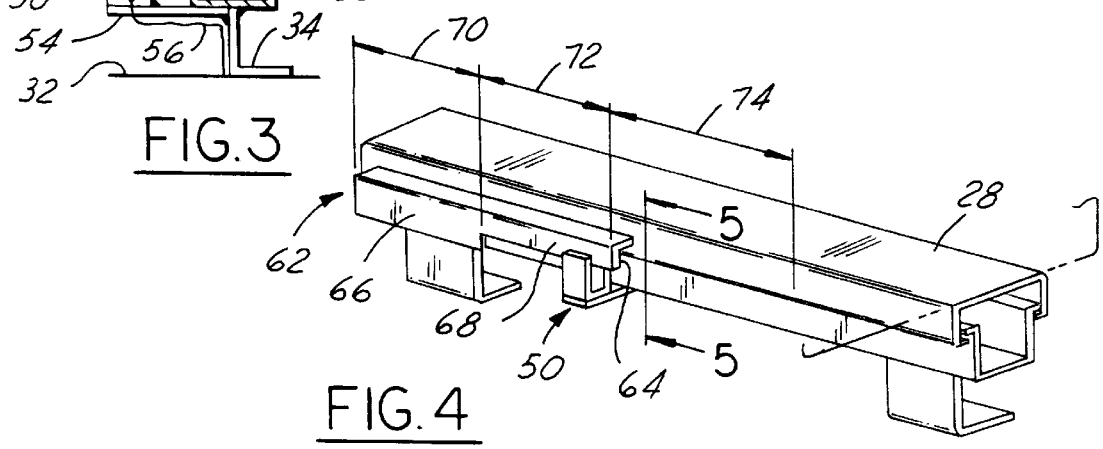
FIG.4

OCCUPANT RESTRAINT SYSTEM WITH SEAT POSITION SENSOR

FIELD OF THE INVENTION

The present invention relates generally to automotive vehicle deployable restraints, and more specifically to a deployable restraint system with a seat position sensing apparatus.

BACKGROUND OF THE INVENTION

It is known in the automotive vehicle occupant restraint art to provide an air bag in the general proximity of an occupant which inflates in response to an impact signal generated by an impact sensor. Under some circumstances, it has been found desirable to vary the manner in which the restraint is inflated so as to provide an appropriate restraining force. This variation of restraint inflation can be accomplished by moderating the amount of inflation medium, for example, a gas which enters the restraint. It is known to sense various occupant characteristics to assist in determining an appropriate restraint inflation. Such characteristics may include whether an occupant is belted, the belt payout, an occupant weight, a seat incline position, occupant position on a seat, and seat position with respect to the vehicle. These characteristics may be determined by sensors, including for example, ultrasonic position sensors, as disclosed in U.S. Pat. Nos. 5,413,378 and 5,626,359 (both to Steffans, Jr. et al.), and occupant weight sensors and seat back incline angle sensors, as disclosed in U.S. Pat. No. 5,573,269 (Gentry et al.). These systems abstractly refer to a seat position sensor without providing particular embodiments of such.

It is known to provide a linear potentiometer in conjunction with a slidable occupant seat in order to determine seat position, as seen in U.S. Pat. Nos. 5,624,132 (Blackburn et al.) and 5,653,462 (Breed et al.). There is a need, however, for a seat sensing apparatus for use in conjunction with a deployable restraint which is less expensive, more reliable, and easier to install and maintain.

SUMMARY OF THE INVENTION

The present invention overcomes the deficiencies of the related art by providing a deployable passenger restraint system for an automotive vehicle having an occupant seat mounted on a seat track for adjustable movement in a longitudinal direction, the seat track having a movable rail in slidable relationship with the stationary rail mounted to the vehicle floor. The system includes a deployable restraint mounted in a forward location of the vehicle, a deployment mechanism for deploying the restraint, a deployment restraint processor for receiving and processing restraint deployment signals and for controlling the deployment mechanism, and a seat position sensor having a stepped flange adapted to be mounted along a predetermined length of the flange side of the movable rail, and a magnetic sensor adapted to be mounted to the stationary rail on the sensor side adjacent the flange side for sensing presence of the flange and relaying a single representative of seat position to the deployment processor. Preferably, the flange is connected a first end of the seat track and has at least two sections of varying height extending toward a middle of the seat track. The magnetic sensor generates a single representing seat position in three zones, including a first zone represented by a first flange section having a first height, a second zone represented by a second flange section having a second height, and a blank section represented by that portion of the seat track not covered by a flange section.

In a second embodiment of the present invention, a pair of switches are mounted on the stationary rail and a lever is mounted to the movable rail for moving the switches between a first position when the lever is on the first side thereof and a second position when the lever is on the second side thereof, the position of the switches on any given time thus indicating a zone in which the seat is located so that inflation of the occupant restraint may be appropriately varied in response thereto.

The embodiments of the present invention thus advantageously provide a seat position sensor which is inexpensive, reliable and easy to install and maintain.

BRIEF DESCRIPTION OF THE DRAWINGS

These and other objects, advantages, and features of the present invention will be apparent to those skilled in the arts upon reading the following description with reference to the accompanying drawings, in which:

FIG. 1 is a perspective view of an automotive vehicle having a deployable occupant restraint system according to the present invention;

FIG. 2 is a perspective view of a seat position sensor according to a first embodiment of the present invention taken in the direction of line 2 in FIG. 1;

FIG. 3 is a cross-sectional view taken along line 3—3 of FIG. 2;

FIG. 4 is a perspective view of a variation of the seat sensor position of FIG. 2 shown in a first position;

DETAILED DESCRIPTION OF THE PREFERRED EMBODIMENT

Figure 6:
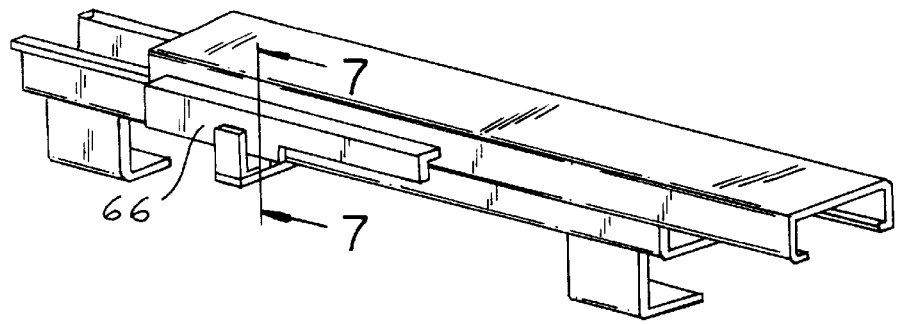
FIG. 6 is a perspective view of the seat position sensor of FIG. 4 shown in a second position.
Figure 5:
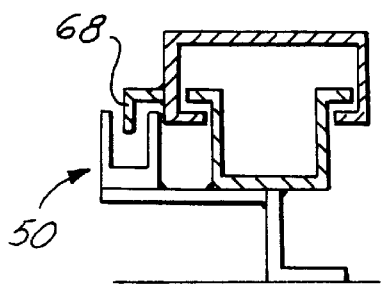
FIG. 5 is a cross-sectional view taken along line 5—5 of FIG. 4.
Figure 7:
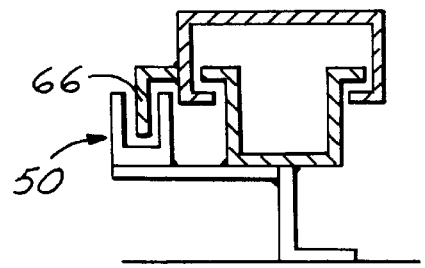
FIG. 7 is a cross-sectional view taken along line 7—7 of FIG. 6.

Turning now to the drawings, and in particular to FIG. 1 thereof, an automotive vehicle 10 is shown with a driver side door removed therefrom. Within the vehicle 10 is shown a driver seat 12 and a front passenger seat 14. The seats 12, 14 are mounted to the vehicle floor for longitudinally slidable movement by way to a pair to seat tracks 16, described in further detail below. Mounted within the vehicle 10 is a deployable passenger restraint system comprising a deployable restraint, for example, an airbag 18 mounted in a forward location of the vehicle, a deployment mechanism 20 for deploying the restraint, and a deployable restraint processor 22 which receives and processes a plurality of restraint deployment signals and which controls the deployment mechanism 20. It should be understood that the airbag 18 may be mounted proximate the passenger seat 14, as seen in FIG. 1, or may also be mounted in the steering wheel 24 in a manner known in the art. The deployable restraint processor 22 may receive various signals representing, for example, vehicle 10 speed, occupant weight, seatbelt position, and others. The processor 22 also receives a seat position signal from a seat position sensor 26 (FIG. 2), which provides a multi-zone indication of seat 14, 12 position.

Referring now to FIGS. 2 and 3, the seat track 16 has a movable rail 28 attached to the seats 12, 14 in slidable relationship with a stationary rail 30 which is attached to a floor section 32 of the vehicle, for example, with an L-brace 34, as is known in the art. The movable rail 28 may be of an open, rectangular cross-section, closed on three sides, and having inward-turned lengthwise extending tabs 36 along a bottom portion thereof (FIG. 3). The stationary rail 30 is of U-shaped cross-section connected on a bottom portion to the bracket 34 and having lengthwise extending tabs 38 outwardly turned from sides 40 to act in cooperation with the tabs 36 of the movable rail 28 to thus provide longitudinal slidable movement therebetween.

On a flange side 42 of the movable rail 28 is mounted a sensor flange 44. The sensor flange 44 can be generally L-shaped and attached upside down with a horizontal leg 46 attached on a first end to the flange side 42 of the movable rail 28 and on a second end attached to a downturned leg 48 (FIGS. 2 and 3). A magnetic sensor 50 is mounted so as to extend from the stationary rail 30 on a sensor side 52 adjacent the flange side 42 for sensing flange 44 position relative thereto and generating a signal representative of seat position to the deployable restraint processor (FIGS. 2 and 3). The magnetic sensor 50 is mounted on a support member 54 extending from the sensor side of the stationary rail in a generally upward fashion so as to receive the downturned leg 48 of the sensor flange 44 therethrough (FIGS. 2 and 3). The sensor 50 generates a seat position signal, as further described below and communicates such a signal through a wire 56 attached thereto which extends to the deployable restraint processor 22 (FIGS. 1 and 3). The seat position sensor of FIGS. 2 and 3 is operative to sense seat position with respect to two zones, including a first zone 60 (FIG. 2) in which the sensor flange is withdrawn from the magnetic sensor 50 (not shown), and a second zone 58 in which the seat has been moved such that the downturned leg 48 of the sensor flange 44 is received in the U-shaped magnetic sensor 50 (FIGS. 2 and 3). The magnetic sensor 50 is constructed and calibrated such that absence of the sensor flange 44 therein generates a first electric signal representing the first zone 60, and presence of the sensor flange 44 therein generates a second electric signal representative of the seat being in the second zone 58.

Turning now to FIGS. 4–7, a second embodiment of a deployable passenger restraint system having a seat position sensor according to the present invention is shown. As seen in FIG. 4, a sensor flange 62 mounted to the movable rail 28, as described above, has a downturned leg 64 with a first section 66 having a first vertical height and a second section 68 having a second vertical height. Such a construction allows seat position sensing in three zones, including a first zone 70 (FIG. 4) in which the seat is moved such that the first section 66 is received in the magnetic sensor 50 (FIGS. 6 and 7), a second zone 72 in which the second flange section 68 is moved within the magnetic sensor 50 (FIGS. 4 and 5), and a third section 74 in which no part of the flange 62 is received within the sensor 50 (not shown).

It should be understood that a sensor flange having more than two flange sections of varying height may be used to more accurately define seat position, as desired, subject only to the ability of the magnetic sensor to sense the difference between the varying flange heights.

The movable rail 28, the stationary rail 30, and the sensor flanges 44, 62, may be made of stamped steel.

Figure 8:
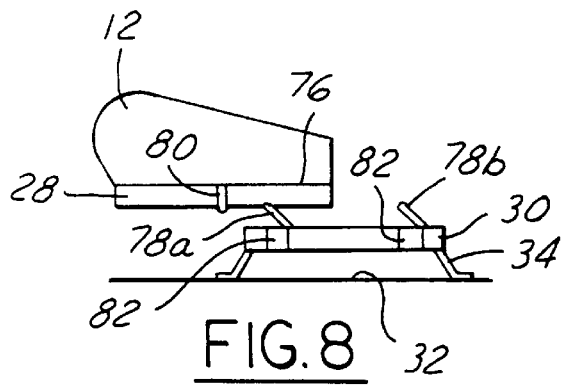
FIG. 8 is a side view of a second embodiment of the present invention shown in a first position.
Figure 9:
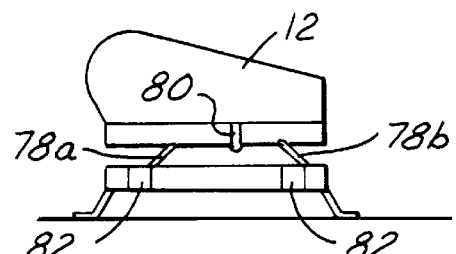
FIG. 9 is a side view similar to FIG. 8 but shown in a second position.
Figure 10:
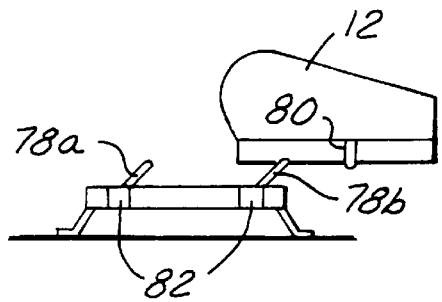
FIG. 10 is a side view similar to FIGS. 8 and 9 but shown in a third position.

Turning now to FIGS. 8–10, an alternative embodiment of a seat position sensor for use with a deployable passenger restraint system according to the present invention is shown. In FIG. 8, the seat 12 has the movable rail 28 attached on a bottom 76 thereof for slidable movement with respect to the stationary rail 30 which is attached via brackets 34 to a vehicle floor section 32. Seat 12 position is sensed with a pair of switches 78 mounted to the stationary rail 30 which are moved between one or two positions by a lever 80 mounted to the movable rail 28 and extending downward therefrom so as to interact with the switches 78 when the seat 12 is moved longitudinally, that is, to the left or right in FIGS. 8–10. Seat position 12 is determined by the alignment of the switches 78a, 78b. When the seat 12 is in a forwardmost position (FIG. 8), switches 78a, 78b are in a first position, tilted to the left, and switch generators 82 send a first signal to the deployable restraint processor 22. The processor 22 then determines through logic that the seat 12 is in the position of FIG. 8. When the seat 12 is moved in a rearward position, that is toward the right in FIG. 9, the lever 80 moves the switch 78 to a second position such that the switch processor 82 associated therewith sends a second signal to the deployable restraint processor 22 which, in combination with a first signal received from the switch processor 82 of the switch 78b, determines that the seat 12 is in a middle position, as shown in FIG. 9. When the seat 12 is moved still further rearward, as seen in FIG. 10, the lever 80 moves the switch 78b to the second position so that the switch processor 82 associated therewith sends a second signal to the processor 22. The processor 22 then determines that the seat 12 is in a rearwardmost zone since both switches 78a, 78b are in a second position and the switch processors are generating a second signal.

It should be understood that only one switch need be used in order to determine the position of a seat with respect to two seat zones. In addition, more than two switches may be used to identify a greater number of seat zones than shown in FIGS. 8–10, which define three seat zones.

Although the preferred embodiment of the present invention has been disclosed, various changes and modifications may be made without departing from the scope of the invention as set forth in the appended claims.

We claim:

1. A deployable passenger restraint system for an automotive vehicle comprising:
   an occupant seat mounted on a seat track for adjustable movement in at least a longitudinal direction, the seat track having a movable rail attached in a slidable relationship with a stationary rail mounted to a vehicle floor;
   a deployable restraint;
   a deployable mechanism for deploying the restraint;
   deployable restraint processor means for receiving and processing a plurality of restraint deployment signals and for controlling the deployment mechanism; and
   a seat position sensor comprising:
      a generally L-shaped flange adapted to be mounted along a predetermined length of a flange side of the movable rail, the flange attached upside down with a horizontal leg attached on a first end to a flange side of the movable rail and a second end of the horizontal leg attached to a downturned leg; and
      a magnetic sensor adapted to be mounted to the stationary rail on a sensor side adjacent the flange side for sensing presence of the flange and relaying a signal representative of seat position to the deployable restraint processor means, wherein the magnetic sensor has a support member extending from a sensor side of the stationary rail and an upwardly oriented U-shaped sensor member mounted to the support member for receiving the flange therethrough.

2. A deployable passenger restraint system according to claim 1 wherein the flange is connected at a first end of the seat track and extends toward a middle of the seat track.

3. A deployable passenger restraint system according to claim 2 wherein the predetermined length represents approximately half of a seat travel distance along the seat track.

4. A deployable passenger restraint system according to claim 2 wherein the flange has at least two sections of varying height.

5. A deployable passenger restraint system according to claim 4 wherein the magnetic sensor generates a signal representing seat position in three zones, including a first zone represented by a first flange section having a first height, a second zone represented by a second flange section having a second height, and a blank section represented by a portion of the seat track not covered by the sensor flange.

6. A deployable passenger restraint system for an automotive vehicle comprising:

an occupant seat mounted on a seat track for adjustable movement in at least a longitudinal direction, the seat track having a movable rail attached in a slidable relationship with a stationary rail mounted to a vehicle floor;

a deployable restraint;

a deployable mechanism for deploying the restraint;

a deployable restraint processor for receiving and processing a plurality of restraint deployment signals and for controlling the deployment mechanism; and a multi-zone seat position sensor comprising:

a sensor flange mounted along a predetermined length of a flange side of the movable rail, the sensor flange having at least two sections along a length thereof with varying vertical heights, the sensor flange attached upside down with a horizontal leg attached on a first end to a flange side of the movable rail and a second end of the horizontal leg attached to a downturned leg; and a magnetic sensor mounted to the stationary rail on a sensor side adjacent the flange side for sensing for sensing position of the flange relative thereto and generating a signal representative of seat position to the deployment processor means, wherein the magnetic sensor has a support member extending from a sensor side of the stationary rail and an upwardly oriented U-shaped sensor member mounted to the support member for receiving the sensor flange therethrough.

* * * * *